(12) United States Patent
Karaoguz et al.

(10) Patent No.: US 7,873,384 B2
(45) Date of Patent: Jan. 18, 2011

(54) MULTIMODE MOBILE COMMUNICATION DEVICE WITH CONFIGURATION UPDATE CAPABILITY

(75) Inventors: Jeyhan Karaoguz, Irvine, CA (US); James D. Bennett, Karlovy Vary (CZ)

(73) Assignee: Broadcom Corporation, Irvine, CA (US)

( * ) Notice: Subject to any disclaimer, the term of this patent is extended or adjusted under 35 U.S.C. 154(b) by 1377 days.

(21) Appl. No.: 11/217,645

(22) Filed: Sep. 1, 2005

(65) Prior Publication Data

US 2007/0082699 A1 Apr. 12, 2007

(51) Int. Cl.
*H04B 1/38* (2006.01)
(52) U.S. Cl. .................... 455/553.1; 455/552.1
(58) Field of Classification Search .......... 455/442, 455/127.4, 553.1, 552.1
See application file for complete search history.

(56) References Cited

U.S. PATENT DOCUMENTS

| 5,519,887 | A  * | 5/1996 | Lieu ............................ 455/266 |
| 2004/0032880 | A1 | 2/2004 | Leung et al. |
| 2005/0202791 | A1* | 9/2005 | Krause ..................... 455/127.4 |
| 2006/0073847 | A1* | 4/2006 | Pirzada et al. ............ 455/556.2 |
| 2006/0084417 | A1* | 4/2006 | Melpignano et al. ........ 455/418 |
| 2006/0293073 | A1* | 12/2006 | Rengaraju et al. ............ 455/518 |

FOREIGN PATENT DOCUMENTS

| DE | 19818515 B1 | 11/1999 |
| EP | 1274266 B1 | 1/2003 |
| GB | 2313257 B1 | 11/1997 |
| WO | WO 2004/045098 | 5/2004 |
| WO | WO 2004049745 B1 | 6/2004 |

* cited by examiner

*Primary Examiner*—Creighton Smith
(74) *Attorney, Agent, or Firm*—McAndrews, Held & Malloy, Ltd.

(57) ABSTRACT

A system and method in a multimode mobile communication device for providing communication configuration update capability. Various aspects of the present invention may comprise establishing a first communication link characterized by a first communication mode of a plurality of communication modes in which the multimode communication device is capable of communicating. Such a first communication link may, for example, be established utilizing a first communication interface module. Communication configuration (or profile) information for a second communication mode may be received over the first communication link. The communication configuration information for the second communication mode may then be utilized to configure the mobile communication device to perform communications in the second communication mode (e.g., utilizing a second communication interface module).

37 Claims, 4 Drawing Sheets

US 7,873,384 B2

MULTIMODE MOBILE COMMUNICATION DEVICE WITH CONFIGURATION UPDATE CAPABILITY

BACKGROUND OF THE INVENTION

Mobile communication devices are continually increasing in popularity. Such mobile communication devices include, for example and without limitation, cellular phones, paging devices, portable email devices, and personal digital assistants with mobile communication capability. Mobile communication devices provide the user with the capability to conduct communications while moving through a variety of environments.

Mobile communication devices may operate in accordance with multiple communication modes. For example a mobile communication device may be adapted to operate in a cellular communication mode and a wireless computer network communication mode. Such multi-mode mobile communication devices may have respective communication configurations for each communication mode.

Mobile communication devices may move through regions that are serviced by a variety of respective communication infrastructures and/or services. For example, a user may carry a mobile communication device from a first region, in which a first communication infrastructure operates in a first frequency band in accordance with a first communication protocol, to a second region, in which a second communication infrastructure operates in a second frequency band in accordance with a second communication protocol. During such a transition, communications utilizing the mobile communication device may be adversely affected.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a mobile communication device for providing communication profile update capability, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
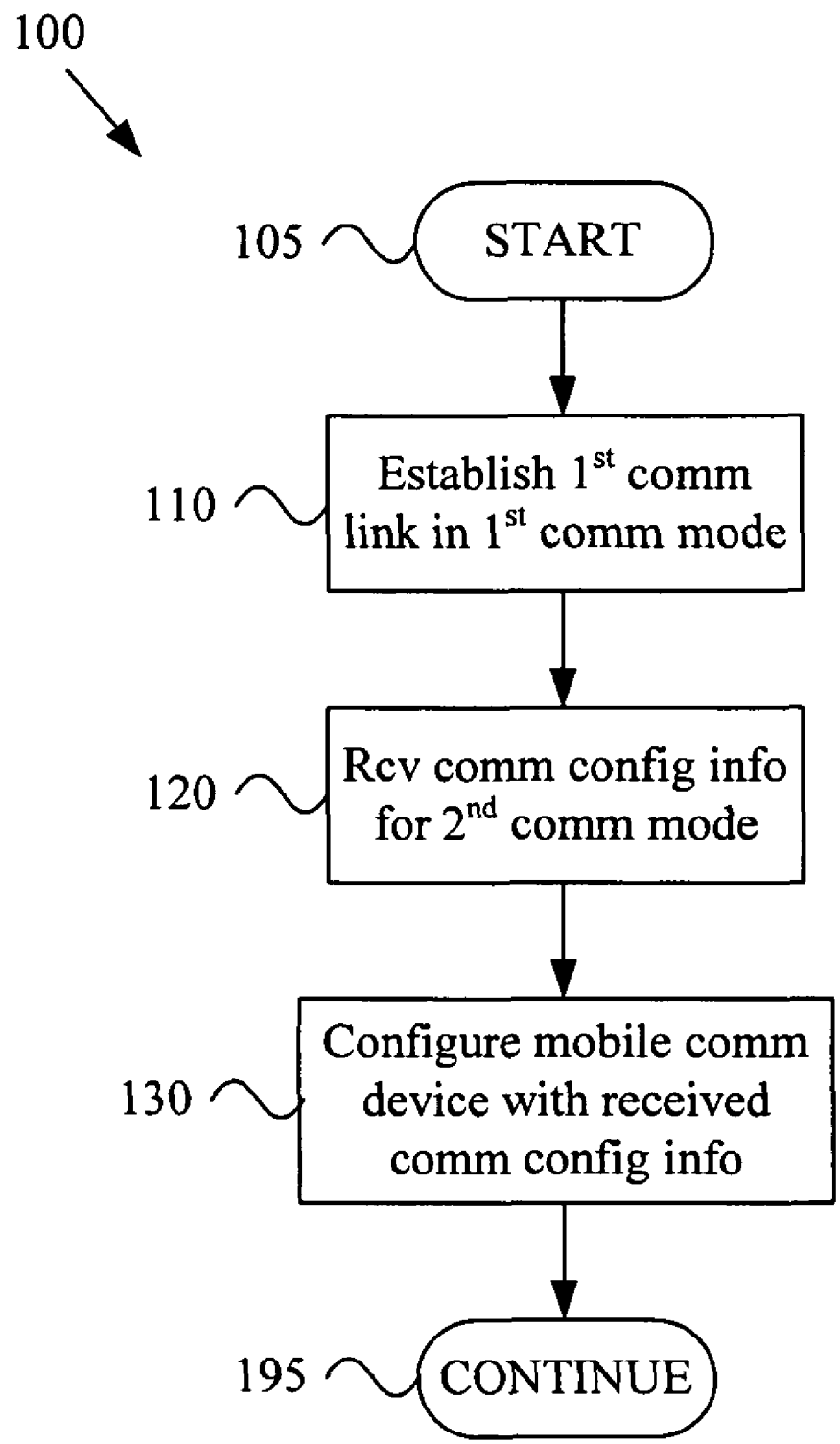
FIG. 1 is a diagram illustrating a method, in a mobile communication device, for providing communication configuration update capability, in accordance with various aspects of the present invention.

FIG. 1 is a diagram illustrating a method 100, in a mobile communication device, for providing communication configuration update capability, in accordance with various aspects of the present invention. The exemplary method 100 may be implemented in any of a variety of mobile communication devices. For example and without limitation, the exemplary method 100 may be implemented in a cellular telephone, pager, portable email device, portable computer, personal digital assistant with mobile communication capability, portable television, portable radio, etc. Accordingly, the scope of various aspects of the present invention should not be limited by characteristics of any particular type of mobile communication device.

The exemplary method 100 may begin at step 105. The exemplary method 100 may begin executing for any of a variety of reasons. For example and without limitation, the exemplary method 100 may begin executing in response to a user command to begin. Also for example, the exemplary method 100 may begin executing in response to a signal received from another communication system. Further for example, the exemplary method 100 may begin executing in response to detected operating conditions (e.g., inoperability of various communication modes). Also for example, the exemplary method 100 may begin in response to a detected change in geographical location, which may be significant from a communication configuration perspective (e.g., for one or more communication modes in which the mobile communication device is generally capability of communicating). Accordingly, the scope of various aspects of the present invention should not be limited by characteristics of any particular initiating causes or conditions.

The exemplary method 100 may, at step 110, comprise establishing a first communication link characterized by a first communication mode of a plurality of communication modes in which the mobile communication device is capable of communicating.

As mentioned previously, a multi-mode mobile communication device may be capable of communicating utilizing any of a variety of communication modes. For example and without limitation, a mobile communication device may be capable of communicating in a cellular telephony communication mode. Also for example, a mobile communication device may be capable of communicating in any of a variety of computer (or data) network communication modes. Further for example, a mobile communication device may be capable of communicating in a television communication mode.

Such computer network communication mode(s) may, for example, comprise characteristics of an Internet communication mode, a Wireless Local Area Network (WLAN) communication mode, a Wireless Personal Area Network (WPAN) communication mode, a Wireless Metropolitan Area Network (WMAN) communication mode, etc. For example and without limitation, a computer communication mode may comprise characteristics of a Bluetooth mode, IEEE 802.11 mode, IEEE 802.15 mode, WiFi mode, UltraWideBand mode, etc.

For example and without limitation, a first communication mode may correspond to a first radio (or first set of radio components) of a mobile communication device, and a second communication mode may correspond to a second radio (or second set of radio components) of the mobile communication device. Also for example, a first communication mode may correspond to a first communication port of the mobile communication device, and a second communication mode may correspond to a second communication port of the mobile communication device. Further for example, a first communication mode may correspond to a first physical layer (e.g., of a multi-layer communication paradigm) of a mobile communication device, and a second communication mode may correspond to a second physical layer of the mobile communication device. Still further for example, a first communication mode may correspond to a first Media Access and Control (MAC) layer (e.g., of a multi-layer communication paradigm) of a mobile communication device, and a second communication mode may correspond to a second MAC layer of the mobile communication device. Still further for example, a first communication mode may correspond to a first communication signal path (e.g., a signal path through various signal processing components), and a second communication mode may correspond to a second communication signal path.

In a non-limiting exemplary scenario, a first communication mode may comprise a cellular telephone communication mode, a second communication mode may comprise a wireless LAN communication mode, a third communication mode may comprise a DVBH communication mode, and a fourth communication mode may comprise a wireless PAN communication mode. The scope of various aspects of the present invention should not be limited by characteristics of particular operating modes in which a multi-mode mobile communication device is capable of communicating.

Step 110 may comprise establishing the first communication link in any of a variety of manners. For example, in a first non-limiting exemplary scenario where the first communication link is characterized by a cellular telephone communication mode, step 110 may comprise establishing communications with a cellular infrastructure in accordance with an appropriate cellular telephony protocol (e.g., GSM/GPRS/EDGE, CDMA/WCDMA, TDMA/PDC, etc.). In a second non-limiting exemplary scenario where the first communication link is characterized by a wireless LAN communication mode, step 110 may comprise establishing communication with a wireless LAN in accordance with IEEE 802.11. In a third non-limiting exemplary scenario where the first communication link is characterized by a wireless PAN communication mode, step 110 may comprise establishing communication with a wireless PAN in accordance with IEEE 802.15. In a fourth non-limiting exemplary scenario, step 110 may comprise establishing the first communication link in accordance with DVB-H ("Digital Video Broadcast-Handheld"). The scope of various aspects of the present invention should not be limited by characteristics of any particular manner of establishing a communication link. Note that the first communication link (and other communication links discussed herein) may comprise characteristics of wireless communication links, wired communication links, tethered optical communication links and non-tethered optical communication links.

The exemplary method 100 may, at step 120, comprise receiving communication configuration information for a second communication mode over the first communication link (e.g., as established at step 110). The communication configuration information may, for example, comprise information utilized to configure portions of the mobile communication device for communication (e.g., enabling communication) in the second communication mode. The communication configuration information may comprise characteristics of any of a variety of types of configuration information.

For example and without limitation, the communication configuration information (which may also be referred to herein as "communication profile information") may comprise settings for various hardware and/or software modules performing physical layer communication. The communication configuration information may, for example, comprise configuration parameters for various tuners, frequency synthesizers or phase lock loops, filters, signal generators, transmitters, coders/decoders, etc.

For example, the communication configuration information may comprise information selecting between various available signal-processing modules or components (e.g., particular functional blocks) of the mobile communication device. Also for example, the communication configuration information may comprise information governing operational characteristics of selected modules or components. Additionally for example, the communication configuration information may comprise information specifying one or more signal processing pathways for information or a signal being processed (e.g., routing a signal or data through a particular set of modules or components).

Also for example, the communication configuration information may comprise settings for various hardware and/or software modules performing MAC layer or other higher layer communications. For example, the communication configuration information may comprise settings for performing secure communications. Also for example, the communication configuration information may comprise configuration information corresponding to various communication protocols. Further for example, the communication configuration information may comprise configuration information corresponding to beacon signal characteristics and/or signal power levels. Still further for example, the communication configuration information may comprise configuration information corresponding to sleep mode operation. In a non-limiting exemplary scenario, the communication configuration information may comprise frequency or frequency band information. In another non-limiting exemplary scenario, the communication configuration information may comprise spread spectrum information (e.g., code or hopping sequence information).

The communication configuration information may, for example, comprise executable software instructions, which may, for example, be executed during communication in the second communication mode. As a non-limiting example, such software instructions may comprise a software module that is executed during encoding/decoding, encrypting/decrypting or transmitting/receiving information communicated in the second communication mode. Further for example, the communication configuration information may comprise state machine specification information.

The communication configuration information may, for example, comprise information that is customized to the mobile communication device. For example, the transmitter of the communication configuration information may be aware of the specific configuration needs of the mobile communication device or with a group of mobile communication devices to which the mobile communication device belongs (e.g., device type, service plan members, etc.). Alternatively, for example, the communication configuration information may comprise a set of configuration information that is universal for the second communication mode (e.g., designed to provide configuration information that any mobile communication device may utilize). For example, in such an exemplary scenario, the mobile communication device may determine which of the universal communication configuration information is applicable to the mobile communication device.

In another example, the communication configuration information may comprise a predetermined communication setting profile associated with a particular geographical region. For example, in an exemplary scenario where the mobile communication device has recently entered a nation where a particular wireless LAN protocol operates somewhat differently (e.g., frequency range, power levels, coding/decoding, encryption/decryption, etc.), the communication configuration information may comprise a profile of configuration settings designed to enable the mobile communication device to communicate using the particular wireless LAN protocol in the particular nation.

In various non-limiting exemplary scenarios, the communication configuration information may be communicated or formatted in accordance with a known (e.g., standard or universal) protocol. For example, various portions of the communication configuration may be received in a predefined format, flagged with predefined identification markers, received in a particular order, etc.

Step 120 may comprise receiving the communication configuration information in any of a variety of manners. For example, step 120 may comprise receiving communication configuration information corresponding to a second communication protocol (e.g., utilized in the second communication mode), which is communicated using a first communication protocol (e.g., associated with the first communication mode). Also for example, step 120 may comprise receiving communication configuration information through a first communication port, where the configuration information corresponds to configuring a second communication port. Further for example, step 120 may comprise receiving communication configuration information through a first physical layer, where the configuration information corresponds to configuring a second physical layer. Still further for example, step 120 may comprise receiving communication configuration information through a first MAC layer, where the configuration information corresponds to configuring a second MAC layer.

Step 120 may comprise receiving the communication configuration information over any of a variety of communication media. For example and without limitation, step 120 may comprise receiving the communication configuration information over a Radio Frequency (RF) medium. Also for example, step 120 may comprise receiving the communication configuration information over a non-tethered optical medium. In various non-limiting exemplary scenarios, step 120 may comprise receiving the communication configuration information over a wired or tethered optical medium.

Step 120 may comprise receiving the communication configuration information from any of a variety of information sources. For example, step 120 may comprise receiving the communication configuration information from a wireless LAN or wireless PAN access point. Further for example, step 120 may comprise receiving the communication configuration information from a cellular base station or from a satellite. Still further for example, step 120 may comprise receiving the communication configuration information from a broadcast television or radio station. Yet further for example, step 120 may comprise receiving the communication configuration information from a television communication system.

In general, step 120 may comprise receiving communication configuration information for a second communication mode over the first communication link (e.g., as established at step 110). Accordingly, the scope of various aspects of the present invention should not be limited by characteristics of any particular communication configuration information associated with a communication mode or by characteristics of any particular manner of receiving such information.

The exemplary method 100 may, at step 130, comprise configuring the mobile communication device with the received communication configuration information (e.g., as received at step 120). Step 130 may comprise configuring the mobile communication device with the received communication configuration information in any of a variety of manners.

For example and without limitation, step 130 may comprise storing the communication configuration information in a memory space allocated to configuration information corresponding to the second communication mode. For example, step 130 may comprise storing received communication configuration information in a predefined data structure corresponding to configuration information for the second communication mode.

In a non-limiting exemplary scenario, the mobile communication device may comprise various memory spaces allocated to default or "home base" settings and various other memory spaces allocated to dynamic or "travel" configuration settings. In such an exemplary scenario, step 130 may comprise storing the communication configuration information in memory space allocated to dynamic communication configuration settings.

Also for example, step 130 may comprise storing the configuration information (or at least a portion thereof) in hardware registers dedicated to storing configuration information (e.g., module selection information, signal path selection information, executable code, state machine configuration information, frequency settings, power settings, filter tap parameters, codec settings, tuner settings, etc.). In a non-limiting exemplary scenario, a filter may be communicatively coupled to a plurality of control registers through a switch, where the switch is controlled as a function of communication mode. For example, operating in the second communication mode may cause the switch to present configuration information in various devices that corresponds to the devices supporting the second communication mode.

In general, step 130 may comprise configuring the mobile communication device with the received communication configuration information (e.g., as received at step 120). Accordingly, the scope of various aspects of the present invention should not be limited by characteristics of any particular manner of configuring received configuration information into a mobile communication device.

The exemplary method 100 may, at step 195, comprise performing continued processing. Step 195 may comprise characteristics of any of a large variety of continued processing. For example and without limitation, step 195 may comprise establishing a second communication link using the second communication mode. For example, step 195 may comprise utilizing the communication configuration information received at step 120 and utilized for configuring at step 130 to establish a communication link in the second communication mode.

In a non-limiting exemplary scenario, where step 110 comprised establishing a communication link in a cellular telephone communication mode, and step 120 comprised receiving communication configuration information for a wireless LAN communication mode, step 195 may comprise utilizing the received communication configuration information (e.g., used for configuring at step 130) to establish a wireless LAN communication link.

Step 195 may, for example, comprise directing execution flow of the exemplary method 100 to step 110 for receiving and utilizing communication configuration information corresponding to a third communication mode. Also for example, step 195 may comprise directing execution flow of the exemplary method 100 to step 110 for receiving and utilizing updated communication configuration information corresponding to the first and/or second communication modes.

Step 195 may also, for example, comprise interfacing with a user and/or other system to determine whether additional communication configuration information is needed. Further for example, step 195 may comprise determining geographical location and/or capabilities of the mobile communication device to determine whether to seek additional communication configuration information.

In general, step 195 may comprise performing any of a large variety of continued processing. Accordingly, the scope of various aspects of the present invention should not limited by characteristics of any particular type of continued processing.

The exemplary method 100 was presented to provide a specific non-limiting illustration of generally broader aspects of the present invention. Accordingly, the scope of various aspects of the present invention should not be limited by characteristics of the exemplary method 100.

Figure 2:
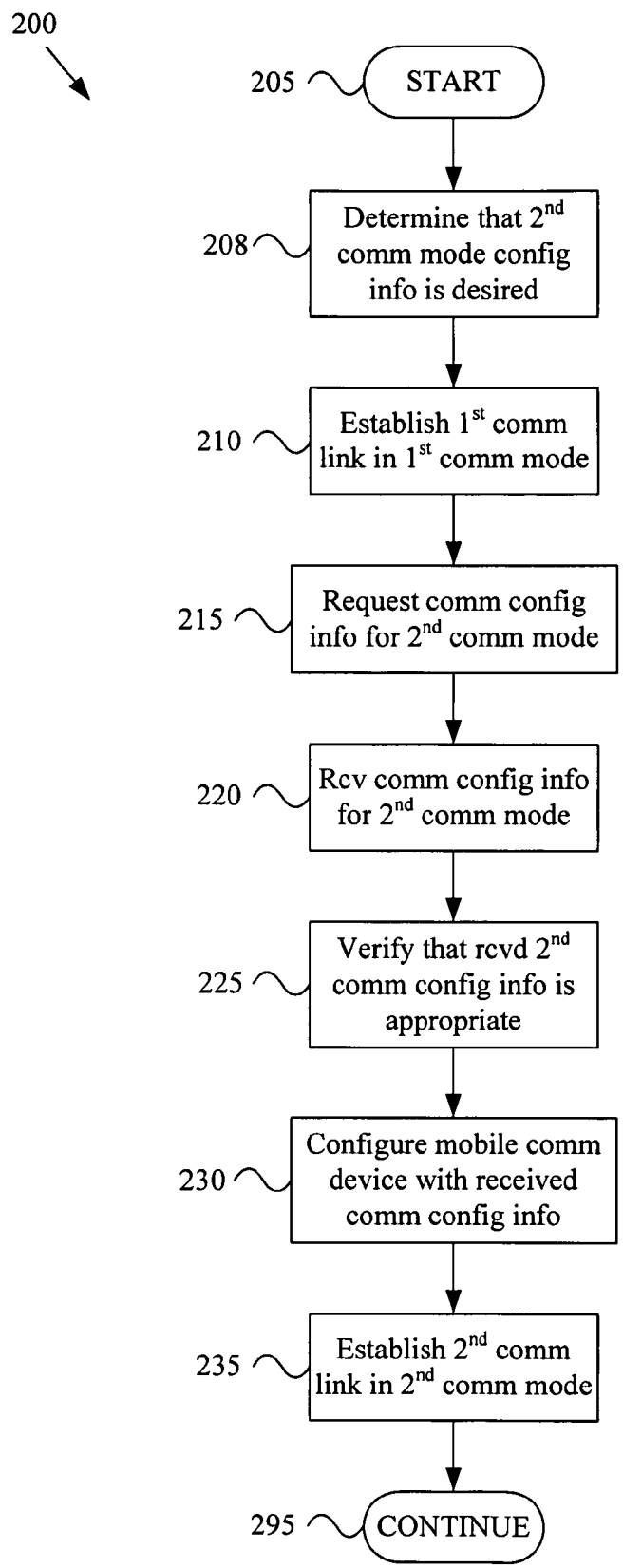
FIG. 2 is a diagram illustrating a method, in a mobile communication device, for providing communication configuration update capability, in accordance with various aspects of the present invention.

FIG. 2 is a diagram illustrating a method 200, in a mobile communication device, for providing communication configuration update capability, in accordance with various aspects of the present invention. The exemplary method 200 may, for example and without limitation, share various characteristics with the exemplary method 100 illustrated in FIG. 1 and discussed previously.

The exemplary method 200 may, at step 208, comprise determining that updated communication configuration information is desirable. Step 208 may comprise making such determination in any of a variety of manners. For example, step 208 may comprise making such determination based on a user input. Such a user input may, for example, comprise a user input directing the mobile communication device to obtain updated communication configuration information or directing the mobile communication device to determine whether such a configuration update is necessary.

Also, step 208 may comprise making such determination based on a signal received from another system. For example, step 208 may comprise receiving information during communicating in a first communication mode that indicates updated configuration information is necessary for a second communication mode. In a non-limiting exemplary scenario, while operating in a cellular telephony communication mode, the mobile communication device may receive a signal from the cellular communication network that indicates to the mobile communication device that a configuration update might be necessary. In another non-limiting exemplary scenario, upon a mobile communication device moving from the United States to country B, the cellular communication system in country B may notify the mobile communication device that WiFi configuration parameters are different in country B than in the U.S.

Step 208 may, for example, comprise determining that a particular communication mode is not presently available and that a configuration update is desirable. For example, a signal generated at a communication hub (e.g., an airport or international train station) may notify the mobile communication device that a change in configuration is necessary, or at least that the mobile communication device should inquire about the present integrity of configuration settings (e.g., all configuration settings or particular configuration settings).

Step 208 may, for example, comprise determining that a configuration update is desirable based, at least in part, on geographical location of the mobile communication device. Step 208 may, for example, comprise determining geographical location in any of a variety of manners. For example, step 208 may comprise receiving geographical location information from a user. Step 208 may also, for example, comprise receiving geographical location information from a global positioning system. Additionally, for example, step 208 may comprise ascertaining geographical location from information received from other communication systems (e.g., cellular communication systems, computer networks, etc.).

Step 208 may, for example, comprise determining that the geographical location of the mobile communication device corresponds to a different set of configuration parameters than a set of configuration parameters currently utilized to configure the mobile communication device. Step 208 may comprise making such determination in any of variety of manners. For example, step 208 may comprise presuming that a significant change in geographical location (e.g., to a different nation) corresponds to a change in configuration information. Also for example, step 208 may comprise accessing a list of geographical regions for which configuration parameters for particular operating modes are different than a default set of configuration parameters. In a non-limiting exemplary scenario, step 208 may comprise determining that the mobile communication device has moved from the United States to country B, and that a country B location corresponds to communication parameters that are different from corresponding U.S. communication parameters.

Step 208 may additionally, for example, comprise determining that communication configuration information is desirable based, at least in part, on determining that a corresponding communication mode is not operable (e.g., fully or partially). In a non-limiting exemplary scenario, step 208 may comprise determining that a Bluetooth communication mode is not operating correctly, and determine that a configuration update might be necessary.

In general, step 208 may comprise determining that updated communication configuration information is desirable. Accordingly, the scope of various aspects of the present invention should not be limited by characteristics of any particular manner of making such determination.

The exemplary method 200 may, at step 210, comprise establishing a first communication link characterized by a first communication mode of the plurality of communication modes. Step 210 may, for example and without limitation, share various characteristics with step 110 of the exemplary method 100 illustrated in FIG. 1 and discussed previously.

The exemplary method 200 may, at step 215, comprise requesting communication configuration information (e.g., over the first communication link established at step 210). For example, step 215 may comprise requesting communication configuration information corresponding to a second communication mode. Step 215 may comprise requesting the communication configuration information in any of a variety of manners.

For example and without limitation, step 215 may comprise requesting communication configuration information that is associated with a particular mobile communication device or type of mobile communication device. Step 215 may, for example, comprise requesting communication configuration information that is associated with a particular communication mode (e.g., cellular telephone communication mode, 802.11 communication mode, Bluetooth communication mode, DVB-H communication mode, 802.15 communication mode, UltraWideBand communication mode, etc.). Step 215 may also, for example, comprise requesting communication configuration information that is associated with a particular geographical region (e.g., a particular nation, state, city, campus, building, etc.).

Step 215 may, for example and without limitation, comprise transmitting various identification information. For example, step 215 may comprise transmitting information identifying a particular communication service or service provider. Step 215 may, for example, comprise transmitting information identifying the particular mobile communication device or particular type of mobile communication device. Also for example, step 215 may comprise transmitting information specifically identifying the user of the mobile communication device. Further for example, step 215 may comprise transmitting information identifying a particular manufacturer (e.g., of the mobile communication device or various components of the mobile communication device).

Step 215 may, for example, comprise transmitting information describing the mobile communication device. Such information may, for example, comprise information describing various capabilities of the mobile communication device (e.g., identifying communication modes in which the mobile communication device is capable of communicating). Also for example, such information may comprise information identifying particular modules or components of the mobile communication device (e.g., hardware components, software components, operating system, etc.).

In general, step 215 may comprise requesting communication configuration information (e.g., over the first communication link established at step 210). Accordingly, the scope of various aspects of the present invention should not be limited by characteristics of any particular manner of requesting communication configuration information or any particular information that may be transmitted as part of such a request.

The exemplary method 200 may, at step 220, comprise receiving communication configuration information (e.g., as requested at step 215) over the first communication link (e.g., as established at step 210), where the communication configuration information corresponds to a second communication mode different from the first communication mode. Step 220 may, for example and without limitation, share various characteristics with step 120 of the exemplary method 100 illustrated in FIG. 1 and discussed previously.

The exemplary method 200 may, at step 225, comprise verifying that the communication configuration information (e.g., as received at step 220) is appropriate for the mobile communication device. For example and without limitation, step 225 may comprise determining whether various configuration parameters of the received configuration information are within an acceptable range. Also for example, step 225 may comprise performing various tests utilizing the received configuration information (e.g., conducting a test communication utilizing the received configuration information). Further for example, step 225 may comprise determining whether various configuration parameters are compatible with various hardware and/or software modules of the mobile communication device. Additionally, step 226 may comprise verifying that a source of the received communication configuration information is as expected (e.g., performing source authentication). Accordingly, the scope of various aspects of the present invention should not be limited by characteristics of any particular manner of verifying that received communication configuration information is appropriate for the mobile communication device.

The exemplary method 200 may, at step 230, comprise configuring the mobile communication device with the communication configuration information (e.g., as received at step 220 and verified at step 225). Step 230 may, for example and without limitation, share various characteristics with step 130 of the exemplary method 100 illustrated in FIG. 1 and discussed previously.

The exemplary method 200 may, at step 235, comprise establishing a second communication link characterized by the second communication mode. For example, as discussed previously, the communication configuration information requested at step 215, received at step 220, verified at step 225 and utilized for configuring the mobile communication device at step 230 may enable the mobile communication device implementing the method 200 to communicate in the second communication mode. For example and without limitation, step 235 may comprise establishing the second communication link while the first communication link established at step 210 is still being maintained.

In a non-limiting exemplary scenario, step 235 may comprise selecting between various communication configuration information currently stored in the mobile communication device. For example, step 235 may comprise selecting between communication configuration information corresponding to United States wireless LAN operation and communication configuration information corresponding to country B, which may, for example, have recently been updated at step 230. Step 235 may then, for example, comprise utilizing the selected communication configuration information to establish a second communication link in the second communication mode.

In general, step 235 may comprise establishing a second communication link characterized by the second communication mode. Accordingly, the scope of various aspects of the present invention should not be limited by characteristics of any particular manner of establishing a communication link.

The exemplary method 200 was presented to provide a specific non-limiting illustration of various generally broader aspects of the present invention. Accordingly, the scope of various aspects of the present invention should not be limited by characteristics of the exemplary method 200.

Figure 3:
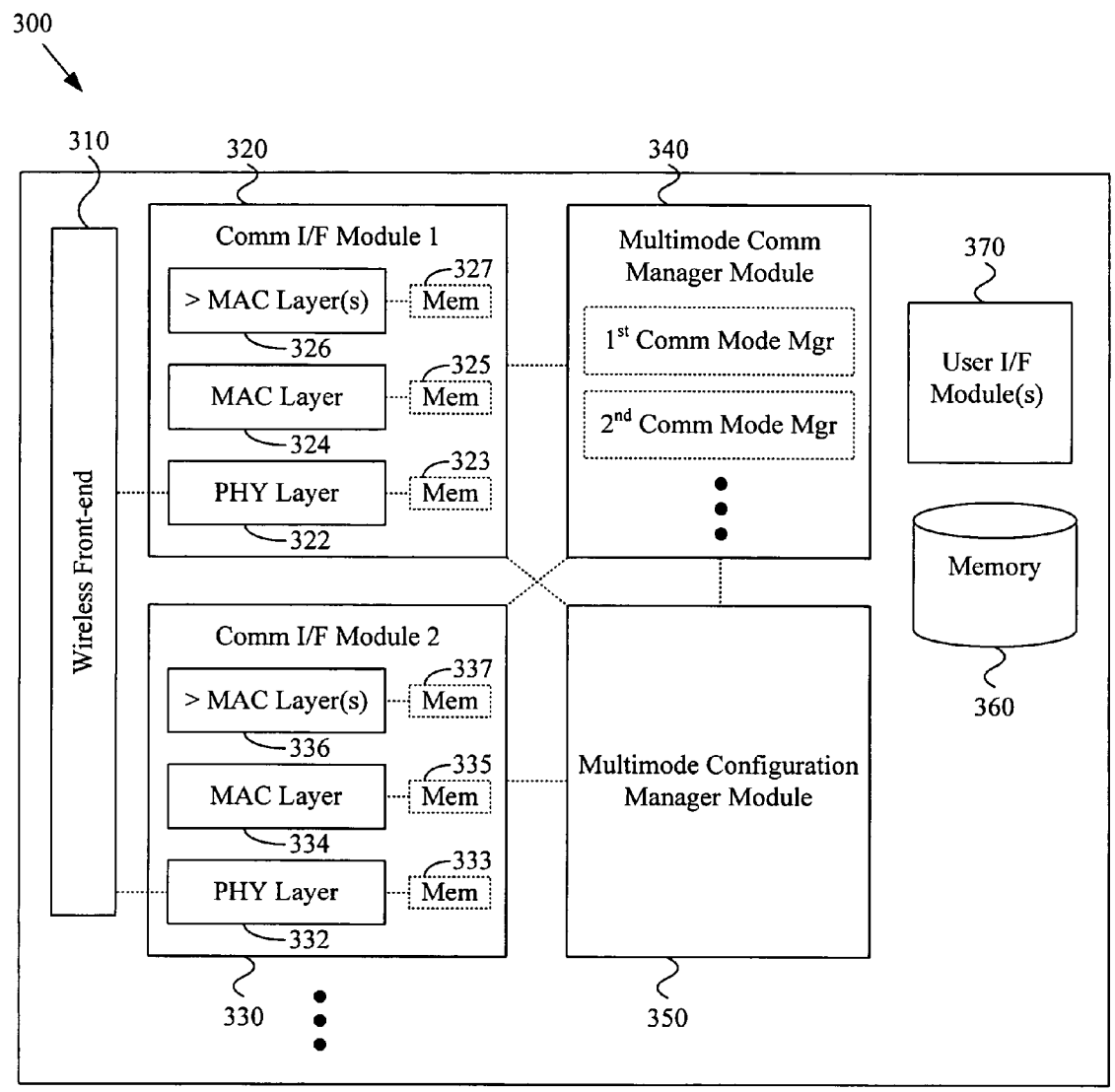
FIG. 3 is a block diagram illustrating a system in a mobile communication device that provides communication configuration update capability, in accordance with various aspects of the present invention.

FIG. 3 is a block diagram illustrating a system 300 in a mobile communication device that provides communication configuration update capability, in accordance with various aspects of the present invention. The exemplary system 300 may, for example and without limitation, share various functional characteristics with the exemplary methods 100, 200 illustrated in FIGS. 1-2 and discussed previously.

The exemplary system 300 may comprise characteristics of any of a variety of communication systems (e.g., mobile communication devices). For example and without limitation, the exemplary system 300 may be implemented in a cellular telephone, pager, portable email device, portable computer, personal digital assistant with mobile communication capability, portable television, portable radio, etc. Accordingly, the scope of various aspects of the present invention should not be limited by characteristics of any particular type of communication system (e.g., mobile communication device).

The exemplary system 300 may, for example, comprise one or more communication front-end module(s) 310 (e.g., wireless communication front-end modules). The exemplary system 300 may also comprise at least a first communication interface module 320 and a second communication interface module 330. Though the exemplary system 300 may comprise any number of communication interface modules, for illustrative clarity, the exemplary system 300 is illustrated with only two. The exemplary system 300 may further comprise a multi-mode communication manager module 340 and a multi-mode configuration manager module 350. The exemplary system 300 may additionally comprise a memory 360 and one or user interface modules 370.

The wireless communication front-end module(s) 310 may, for example, comprise any of a variety of hardware and/or software modules adapted for communicating with other communication systems. For example, the wireless communication front-end module 310 may comprise characteristics of various transceivers utilized to implement various aspects of physical layer communication for a mobile communication device. Note that though the exemplary communication front-end module(s) 310 are illustrated as wireless, the scope of various aspects of the present invention should not be limited by characteristics of wireless communication. For example, the communication front-end module(s) 310 may additionally, or alternatively, be adapted to communicate over a wired link or tethered and non-tethered optical links.

The first communication interface module 320 may comprise any of a variety of communication interface hardware and/or software modules. For example, the first communication interface module 320 may comprise a physical layer module 322, MAC layer module 324 and higher layer module (s) 326. Note that the various communication layers are merely illustrative and should not limit the scope of various aspects of the present invention to characteristics of communication modules having such layers.

The physical layer module 322 may generally provide various physical layer services in support of one or more communication modes. For example, the physical layer module 322 may be adapted to provide physical layer services for a first communication mode. For example and without limitation, the physical layer module 322 may be adapted to sense carrier condition (e.g., whether a channel is busy), transmit or receive information (e.g., via continuous signals, packets or frames), etc. Also for example, the physical layer module 322 may be adapted to form data units, select frequency, modulate/demodulate, encode/decode, etc.

The physical layer module 322 may, for example, comprise a physical layer memory 323 that stores various physical layer configuration parameters. Though the physical layer memory 323 is illustrated with the physical layer module 322, the physical layer memory 323 could reside in any of a variety of memory types and/or locations. For example, the physical layer memory 323 may correspond to hardware registers of the first communication interface module 320. Also for example, the physical layer memory 323 may correspond to a memory space (e.g., a memory space allocated to the first communication interface module 320) of the memory 360. The scope of various aspects of the present invention should not be limited by any particular type of memory or any particular memory location.

The physical layer memory 323 may store any of a variety of communication configuration information (e.g., settings and/or parameters). For example and without limitation, the physical layer memory 323 may store information indicative of module selection, signal processing path selection, executable code, state machine configuration, tuner settings, frequency synthesizer or PLL settings, modulation settings, filter settings, encoder/decoder settings, power settings, data parsing settings, signal detection settings, etc. The scope of various aspects of the present invention should not be limited by characteristics of any particular type of physical layer configuration information.

The MAC layer module 324 may generally provide a variety of functions that support the operation of one or more communication modes. For example, the MAC layer module 324 may be adapted to provide MAC layer services for a first communication mode. For example and without limitation, the MAC layer module 324 may coordinate access to a shared radio channel and utilize one or more protocols to enhance communications. The MAC layer module 324 may also, for example, be adapted to perform scanning functions, authentication functions, association functions, encryption/decryption, power save management, packet fragmentation, etc.

The MAC layer module 324 may, for example, comprise a MAC layer memory 325 that stores various MAC layer configuration parameters. Though the MAC layer memory 325 is illustrated with the MAC layer module 324, the MAC layer memory 325 could reside in any of a variety of memory types and/or locations. For example, the MAC layer memory 325 may correspond to hardware registers of the first communication interface module 320. Also for example, the MAC layer memory 325 may correspond to a memory space (e.g., a memory space allocated to the first communication interface module 320) of the memory 360. The scope of various aspects of the present invention should not be limited by any particular type of memory or any particular memory location.

The MAC layer memory 325 may store any of a variety of communication configuration information (e.g., settings and/or parameters). For example and without limitation, the MAC layer memory 325 may store information indicative of various medium access control characteristics, scanning operation, secure communication, power save operation, fragmentation, etc. The scope of various aspects of the present invention should not be limited by characteristics of any particular type of MAC layer configuration information.

The higher layer module(s) 326 may generally perform various higher level communication functions relative to the MAC layer module 324 and PHY layer module 322. For example, the higher layer module(s) 326 may be adapted to provide various higher-level communication services associated with a first communication mode.

As with the first communication interface module 320, the second communication interface module 330 may comprise any of a variety of communication interface hardware and/or software modules. For example, the second communication interface module 330 may comprise a physical layer module 332, MAC layer module 334 and higher layer module(s) 336. Such modules 332, 334, 336 may, for example and without limitation share various characteristics with physical layer module 322, MAC layer module 324 and higher layer module (s) 326 of the first communication interface module 320 discussed previously.

In a non-limiting exemplary scenario, the first communication interface module 320 may correspond to communication in a first communication mode, and the second communication interface module 330 may correspond to communication in a second communication mode. In another non-limiting exemplary scenario, at least a portion of the first (or second) communication interface module 320 may be utilized for communication in a plurality of communication modes. Accordingly, the scope of various aspects of the present invention should not necessarily be limited by characteristics of a one-to-one correspondence between a communication interface module and a particular communication mode. For example, any of a variety of sub-modules and/or components may be shared between the communication interface modules 320, 330.

The multi-mode communication manager module 340 may generally manage multi-mode communication for the mobile communication device. For example and without limitation, the multi-mode communication manager module

340 may manage general communication operations for the mobile communication device.

The memory module 360 may generally be adapted to store information (e.g., communication configuration information, executable software instructions, intermediate processing data, user information, etc.). The memory module 360 may comprise characteristics of any of a variety of memory types. For example, the memory module 360 may comprise characteristics of a non-volatile memory chip. Further for example, the memory module 360 may comprise characteristics of volatile memory. Also for example, the memory module 360 may comprise characteristics of a hard drive, diskette, CD/DVD reader/writer, removable memory module, etc. Accordingly, the scope of various aspects of the present invention should not be limited by characteristics of any particular type of memory.

The user interface module(s) 370 may generally be adapted to provide a communication link between a mobile communication device utilizing the system 300 and a user of the mobile communication device. The user interface module(s) 370 may comprise characteristics of any of a variety of user interface module(s). Accordingly, the scope of various aspects of the present invention should not be limited by characteristics of any particular type of user interface module.

The multi-mode configuration manager module 350 may generally manage multi-mode configuration for a mobile communication device utilizing the system 300. For example and without limitation, the multimode configuration manager module 350 may share functional characteristics with any, any combination of, or all of the steps of the exemplary methods 100, 200 illustrated in FIGS. 1-2 and discussed previously.

For example, the configuration manager module 350 may, in various non-limiting exemplary scenarios, be adapted to determine that updated communication configuration information (e.g., for a second communication mode) is desirable. The configuration manager module 350 may, for example and without limitation, be adapted to perform functionality exemplified by step 208 of the exemplary method 200.

For example and without limitation, the configuration manager module 350 may be adapted to make such a determination in response to a user input received through the user interface module(s) 370. Also for example, the configuration manager module 350 may be adapted to make such a determination in response to a signal received from another communication system (e.g., through the first communication interface module 320). Further for example, the configuration manager module 350 may be adapted to make such a determination in response to the unavailability or inoperability of the second communication mode. The configuration manager module 350 may, for example, be adapted to make such a determination based on geographical location of the mobile communication device.

Also for example, the configuration manager module 350 may be adapted to establish (e.g., utilizing the first communication interface module 320) a first communication link characterized by a first communication mode. The configuration manager module 350 may, for example, be adapted to perform various functionality exemplified by steps 110 and 210 of the exemplary methods 100 and 200 illustrated in FIGS. 1-2.

Such a first communication mode may, for example, be one of a plurality of communication modes in which a multimode mobile communication device may be capable of communicating. Characteristics of various communication modes were discussed previously.

Additionally for example, the configuration manager module 350 may, in a non-limiting exemplary scenario, be adapted to request communication configuration information. The configuration manager module 350 may, for example, be adapted to perform various functionality exemplified by step 215 of the exemplary method 200 illustrated in FIG. 2.

For example, the configuration manager module 350 may be adapted to request configuration information over a first communication link established utilizing the first communication interface module 320. Such a request may, for example comprise information associated with a particular mobile communication device, mobile communication device type, communication mode, geographical region, identification of a mobile communication device or user, identification of a service or service provider, mobile communication device configuration, components or capability, etc.

Further for example, the configuration manager module 350 may be adapted to receive communication configuration information (e.g., over a communication link established utilizing the first communication interface module 320), where the communication configuration information corresponds to a second communication mode different from the first communication mode. The configuration manager module 350 may, for example and without limitation, be adapted to perform functionality exemplified by steps 120 and 220 of the exemplary methods 100 and 200.

Still further for example, the configuration manager module 350 may, in various non-limiting exemplary scenarios, be adapted to verify that received communication configuration information is appropriate for the mobile communication device. The configuration manager module 350 may, for example and without limitation, be adapted to perform various functionality exemplified by step 225 of the exemplary method 200.

The configuration manager module 350 may also be adapted to configure the mobile communication device with the received communication configuration information (e.g., as requested and/or received utilizing the first communication interface module 320). The configuration manager module 350 may, for example and without limitation, be adapted to perform various functionality exemplified by steps 130 and 230 of the exemplary methods 100 and 200.

For example and without limitation, the configuration manager module 350 may be adapted to store the received communication configuration information (or portions thereof) in hardware registers (e.g., control registers). Such hardware registers may, for example, be associated with the communication interface modules 320, 330 or the wireless communication front-end module(s) 310. In a non-limiting exemplary scenario, the configuration manager module 350 may be adapted to store the received communication configuration information (e.g., corresponding to the second communication mode) in memory modules 333, 335, 337 associated with various communication layers of the second communication interface module 330.

The configuration manager module 350 may also, for example, be adapted to store the received communication configuration information in memory space of the memory 360 that is allocated to configuration information for the second communication mode, memory allocated to the second communication interface module 330, predefined database or data structures, memory allocated to the storage of dynamic communication configuration information, etc.

The multimode communication manager module 340 may, in various non-limiting exemplary scenarios, be adapted to establish a second communication link (e.g., utilizing the second communication interface module 330) characterized by the second communication mode. The multimode communication manager module 340 may, for example and without limitation, be adapted to perform various functionality exemplified by step 235 of the exemplary method 200 illustrated in FIG. 2. For example, the multimode communication manager module 340 may be adapted to utilize the second communication interface module 330 to establish the second communication link in the second communication mode. The second communication interface module 330 (and, e.g., the wireless front-end 310) may, in operating in the second communication mode, operate in accordance with communication configuration information (e.g., received over the first communication link by the first communication interface module 320 operating in the first communication mode and utilized to configure the mobile communication device by the configuration manager module 350).

The configuration manager module 350 may additionally be adapted to perform any of a large variety of continued processing operations. The configuration manager module 350 may, for example and without limitation, be adapted to perform various functionality exemplified by steps 195 and 295 of the exemplary methods 100 and 200.

The exemplary system 300 was presented to provide specific illustrations of various generally broader aspects of the present invention. Accordingly, the scope of various aspects of the present invention should not be limited by characteristics of the non-limiting exemplary system 300.

Figure 4:
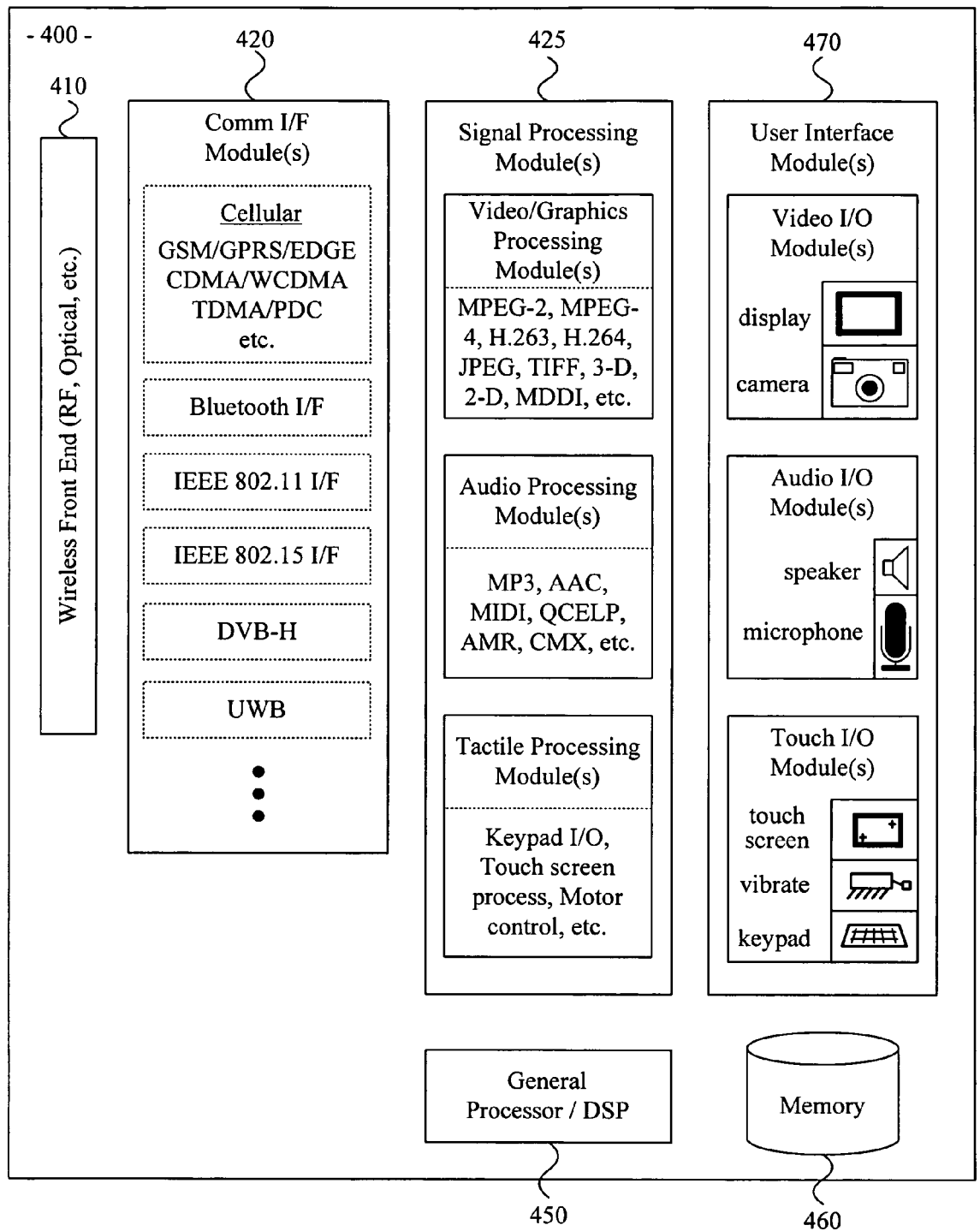
FIG. 4 is a block diagram illustrating a system in a mobile communication device that provides communication configuration update capability, in accordance with various aspects of the present invention.

FIG. 4 is a block diagram illustrating a system 400 in a mobile communication device that provides communication configuration update capability, in accordance with various aspects of the present invention. The exemplary system 400 may, for example and without limitation, share various characteristics with the exemplary system 300 illustrated in FIG. 3 and discussed previously. Also for example, the exemplary system 400 may share various functional characteristics with the exemplary methods 100, 200 illustrated in FIGS. 1-2 and discussed previously.

The exemplary system 400 may comprise one or more wireless communication front-end modules 410 (e.g., wired, tethered, non-tethered and/or wireless front-end modules), which may, for example and without limitation, share various characteristics with the wireless communication front-end module(s) 310 of the exemplary system 300 illustrated in FIG. 3.

The exemplary system 400 may also comprise a plurality of communication interface modules 420. The communication interface modules 420 may, for example and without limitation, share various characteristics with the first and second communication interface modules 320, 330 of the exemplary system 300 illustrated in FIG. 3. For example, the communication interface modules 420 may comprise a cellular communication interface module adapted to communicate in a cellular communication mode (e.g., in accordance with any of, any set of, or all of GSM/GPRS/EDGE, CDMA/WCDMA or TDMA/PDC). Further for example, the communication interface module 420 may comprise an IEEE 802.11 communication interface module adapted to communicate in an 802.11 wireless LAN communication mode. Also for example, the communication interface module 420 may comprise an IEEE 802.15 comm I/F module adapted to communicate in an 802.15 wireless PAN communication mode. Similarly, the communication interface modules 420 may comprise a Bluetooth communication I/F module and Ultra-WideBand communication I/F module. The scope of various aspects of the present invention should not be limited by characteristics of any particular communication interface module or any particular corresponding communication mode.

The exemplary system 400 may comprise various signal processing modules 425, which may perform any of a variety of signal processing activities during communicating with a mobile communication device in any of a variety of communication modes. The exemplary system 400 may also comprise various user interface modules 470. Such user interface modules 470 may, for example and without limitation, share various characteristics with the user interface module(s) 370 of the exemplary system 300 illustrated in FIG. 3. The exemplary system 400 may also comprise a memory module 460, which may share various characteristics with the memory module 360 of the exemplary system 300 illustrated in FIG. 3.

The exemplary system 400 may, for example, comprise a processor module 450. Such a processor module 450 may, for example, be adapted to execute instructions to perform any of a large variety of functions. For example and without limitation, the processor module 450 may share various characteristics with the multimode communication manager module 340 and/or the multimode configuration manager module 350 of the exemplary system 300 illustrated in FIG. 3. Such a processor module 450 may comprise characteristics of any of a variety of processor types. For example, the processor module 450 may comprise characteristics of a microprocessor, microcontroller, digital signal processor, etc.

For illustrative clarity, the exemplary systems 300 and 400 were presented in terms of various functional modules. Various modules may, for example, be implemented in hardware, software or a combination thereof. Also, various modules may share various sub-modules and/or subcomponents. For example and without limitation, various hardware modules may share various electrical components, and various software modules may share various software subroutines. Accordingly, the scope of various aspects of the present invention should not be limited by characteristics of any particular hardware and/or software implementation or by any arbitrary boundaries between various functional modules.

In summary, various aspects of the present invention provide a system and method in a mobile communication device for providing communication configuration update capability. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a multi-mode mobile communication device operable to communicate in a plurality of communication modes, a method for configuring the multi-mode mobile communication device, the method comprising:
    establishing a first communication link characterized by a first communication mode of the plurality of communication modes;
    receiving communication configuration information for a second communication mode over the first communication link, the communication configuration information comprising information identifying a signal-processing module from a plurality of signal-processing modules of the mobile communication device; and configuring the mobile communication device with the received communication configuration information.

2. The method of claim 1, wherein:
one of the first and second communication modes corresponds to a first set of radio components of the multi-mode mobile communication device; and
another of the first and second communication modes corresponds to a second set of radio components of the multi-mode mobile communication device, where the first and second sets of radio components are at least partially different.

3. The method of claim 1, wherein:
one of the first and second communication modes corresponds to a first communication port of the multi-mode mobile communication device; and
another of the first and second communication modes corresponds to a second communication port of the multi-mode mobile communication device.

4. The method of claim 1, wherein:
one of the first and second communication modes corresponds to a first physical layer of the multi-mode mobile communication device; and
another of the first and second communication modes corresponds to a second physical layer of the multi-mode mobile communication device.

5. The method of claim 1, wherein:
one of the first and second communication modes is a telephone communication mode; and
another of the first and second communication modes is a computer communication mode.

6. The method of claim 1, wherein:
one of the first and second communication modes corresponds to a first computer communication network; and
another of the first and second communication modes corresponds to a second computer communication network.

7. The method of claim 1, wherein the communication configuration information comprises physical layer communication settings.

8. The method of claim 1, wherein the communication configuration information comprises information identifying a hardware signal-processing module from a plurality of hardware signal-processing modules of the mobile communication device.

9. The method of claim 1, wherein the communication configuration information comprises information specifying a signal processing path from a plurality of signal processing paths.

10. The method of claim 1, wherein the communication configuration information comprises filter setting information.

11. In a multi-mode mobile communication device operable to communicate in a plurality of communication modes, a method for configuring the multi-mode mobile communication device, the method comprising:
establishing a first communication link characterized by a first communication mode of the plurality of communication modes;
receiving communication configuration information for a second communication mode over the first communication link; and
configuring the mobile communication device with the received communication information,
wherein the communication configuration information comprises codec setting information.

12. In a multimode mobile communication device operable to communicate in a plurality of communication modes, a method for configuring the multi-mode mobile communication device, the method comprising:
establishing a first communication link characterized by a first communication mode of the plurality of communication modes;
receiving communication configuration information for a second communication mode over the first communication link; and
configuring the mobile communication device with the received communication configuration information,
wherein the communication configuration information comprises power setting information.

13. The method of claim 1, wherein the communication configuration information comprises executable instructions.

14. The method of claim 1, wherein the communication configuration information comprises information specifying operation of the identified signal-processing module.

15. The method of claim 1, wherein the communication configuration information comprises communication configuration information customized for at least one of: the mobile communication device, and a group of mobile communication devices of which the mobile communication device is a member.

16. The method of claim 1, wherein configuring the mobile communication device with the received communication configuration information comprises storing the communication configuration information in a memory space dedicated to storing communication configuration information.

17. The method of claim 1, comprising, prior to receiving communication configuration information, determining that updated communication configuration information is desired based at least in part on geographical information.

18. The method of claim 1, comprising, prior to receiving communication configuration information, requesting communication configuration information associated with a particular geographical region.

19. The method of claim 1, comprising
establishing a second communication link in the second communication mode utilizing the received communication configuration information.

20. A multi-mode mobile communication device operable to communicate in a plurality of communication modes, the mobile communication device comprising:
a communication interface module operable to establish a first communication link characterized by a first communication mode of the plurality of communication modes; and
at least one module operable to:
receive communication configuration information for a second communication mode over the first communication link, the communication information comprising information identifying a signal-processing module from a plurality of signal-processing modules of the mobile communication device; and
configure the mobile communication device with the received communication configuration information.

21. The mobile communication device of claim 20, further comprising:
a first set of radio components that corresponds to the first communication mode; and
a second set of radio components, at least partially different from the first set of radio components, that corresponds to the second communication mode.

22. The mobile communication device of claim 20, further comprising:

a first communication port that corresponds to the first communication mode; and a second communication port that corresponds to the second communication mode.

23. The mobile communication device of claim 20, wherein the communication configuration information comprises physical layer communication settings.

24. The mobile communication device of claim 20, further comprising a plurality of hardware signal-processing modules, and wherein the communication configuration information comprises information identifying a hardware signal-processing module from the plurality of hardware signal-processing modules of the mobile communication device.

25. The mobile communication device of claim 20, further comprising a plurality of signal-processing paths, and wherein the communication configuration information comprises information specifying a signal-processing path from the plurality of signal-processing paths.

26. The mobile communication device of claim 20, further comprising a filter, and wherein the communication configuration information comprises filter setting information corresponding to the second communication mode.

27. A multi-mode mobile communication device operable to communicate in a plurality of communication modes, the mobile communication device comprising:

a communication interface module operable to establish a first communication link characterized by a first communication mode of the plurality of communication modes;

a codec; and at least one module operable to:

receive communication configuration information for a second communication mode over the first communication link, the communication information comprising information identifying a signal-processing module from a plurality of signal-processing modules; and configure the mobile communication device with the received communication configuration information, wherein the communication configuration information comprises codec setting information corresponding to the second communication mode.

28. The mobile communication device of claim 20, further comprising at least one module operable to execute instructions, and wherein the communication configuration information comprises executable instruction information.

29. The mobile communication device of claim 20, wherein the at least one module is operable to, prior to receiving communication configuration information, determine that communication configuration information is desirable based at least in part on geographical information.

30. The mobile communication device of claim 20, wherein the at least one module is operable to, prior to receiving communication configuration information, request communication configuration information associated with a particular geographical region.

31. In a mobile communication device, a method for controlling operation of the mobile communication device, the method comprising:

establishing a first communication link characterized by a first communication protocol;

receiving communication configuration information over the first communication link, wherein the communication configuration information corresponds to a second communication protocol different from the first communication protocol and the communication configuration information comprises information identifying a signal-processing module from a plurality of signal-processing modules of the mobile communication device;

configuring the mobile communication device with the received communication configuration information; and establishing, utilizing a mobile communication device configuration based on the received configuration information, a second communication link characterized by the second communication protocol.

32. The method of claim 31, wherein:

one of the first and second communication protocols corresponds to a first set of radio components of the multi-mode mobile communication device; and another of the first and second communication protocols corresponds to a second set of radio components of the multi-mode mobile communication device, where the first and second sets of radio components are at least partially different.

33. The method of claim 31, wherein:

one of the first and second communication protocols corresponds to a first communication port of the multi-mode mobile communication device; and another of the first and second communication protocols corresponds to a second communication port of the multi-mode mobile communication device.

34. The method of claim 31, wherein the communication configuration information comprises information identifying a hardware signal-processing module from a plurality of hardware signal-processing modules.

35. The method of claim 31, wherein the communication configuration information comprises information specifying a signal processing path from a plurality of signal processing paths.

36. A multi-mode mobile communication device operable to communicate in a plurality of communication modes, the mobile communication device comprising:

a communication interface module operable to establish a first communication link characterized by a first communication mode of the plurality of communication modes; and at least one module operable to:

receive communication configuration information for a second communication mode over the first communication link; and configure the mobile communication device with the received communication configuration information, wherein the communication configuration information comprises power setting information.

37. The multi-mode mobile communication device of claim 20, wherein the at least one module is operable to establish a second communication link in the second communication mode utilizing the received communication configuration information.

* * * * *